United States Patent [19]

Turk et al.

[11] Patent Number: 5,738,935
[45] Date of Patent: Apr. 14, 1998

[54] PROCESS TO MAKE A COMPOSITE OF CONTROLLABLE POROSITY

[75] Inventors: David L. Turk, Stow; Otto Grill, Independence, both of Ohio

[73] Assignee: FormTech Enterprises, Inc., Stow, Ohio

[21] Appl. No.: 603,912

[22] Filed: Feb. 22, 1996

Related U.S. Application Data

[60] Continuation-in-part of Ser. No. 367,713, Jan. 3, 1995, abandoned, which is a division of Ser. No. 113,989, Aug. 30, 1993.

[51] Int. Cl.⁶ .................................................. B32B 3/26
[52] U.S. Cl. .......................... 428/304.4; 428/308.8; 428/375; 428/378; 428/392; 428/393; 428/394; 428/537.1; 264/177.17; 264/210.1; 264/210.2; 264/210.6; 264/211; 264/211.13
[58] Field of Search .................. 264/177.17, 210.1, 264/210.2, 210.6, 211, 211.113; 428/235, 248, 265, 268, 285, 287, 364, 365, 375, 378, 392, 393, 394

[56] References Cited

U.S. PATENT DOCUMENTS

| | | | |
|---|---|---|---|
| 3,770,537 | 11/1973 | Elton | 264/49 |
| 4,168,251 | 9/1979 | Schinzel et al. | 260/17.4 R |
| 4,258,917 | 3/1981 | Murphy | 273/65 D |
| 4,396,039 | 8/1983 | Klenk et al. | 138/118.1 |
| 4,776,784 | 10/1988 | Batiwk | 423/203 |
| 4,957,372 | 9/1990 | Meyer | 366/76 |
| 5,169,712 | 12/1992 | Tapp | 428/315.5 |
| 5,340,642 | 8/1994 | Baumgartl et al. | 428/224 |
| 5,406,768 | 4/1995 | Giuseppe et al. | 52/730.4 |
| 5,441,801 | 8/1995 | Deaner et al. | 428/326 |
| 5,486,553 | 1/1996 | Deaner et al. | 524/13 |
| 5,534,327 | 7/1996 | Nish et al. | 428/15 |
| 5,536,264 | 7/1996 | Hsweh et al. | 604/368 |

FOREIGN PATENT DOCUMENTS

| | | |
|---|---|---|
| 586211A1 | 3/1994 | European Pat. Off. . |
| 586212A2 | 3/1994 | European Pat. Off. . |
| 586212A3 | 3/1994 | European Pat. Off. . |
| 586213A1 | 3/1994 | European Pat. Off. . |

*Primary Examiner*—Helen Lee
*Attorney, Agent, or Firm*—Oldham & Oldham Co., LPA

[57] ABSTRACT

The invention described both a process for the preparation of a natural fiber and thermoplastic composite and the resulting products therefrom. The process includes the steps of mixing the natural fiber and the thermoplastic in a blender with a porosity aid to form a mixture; adding the mixture to a heated extruder; compressing the mixture with an extruder screw having a plurality of flight sections, at least one of the flight sections serving as a compression flight section which compresses the mixture by having its flights spaced closer together than other adjacent flight sections, and at least one other vent flight section which allows gaseous reaction products to be removed from the extruder through a vent in the extruder by having its flights spaced farther apart than the compression section, the vent flight section being positioned after the compression flight section; extruding the mixture through an extrusion die as a composite; and shaping the composite in a vacuum calibration device to a desired profile. The process further includes the step of co-extruding a second thermoplastic onto the natural fiber/thermoplastic composite for some applications (e.g., windows and doors).

36 Claims, 5 Drawing Sheets

PROCESS TO MAKE A COMPOSITE OF CONTROLLABLE POROSITY

CROSS REFERENCE TO RELATED APPLICATION

This application is a continuation-in-part of U.S. patent application Ser. No.: 08/367,713, filed Jan. 3, 1995, now abandoned, which is a divisional of U.S. patent application Ser. No.: 08/113,989, filed Aug. 30, 1993, now allowed.

TECHNICAL FIELD

The invention described herein pertains generally to a process to make a stainable and paintable composite comprising a plastic and a mixture of plastic and natural fibers and the resulting products, particularly for use as door and window components.

BACKGROUND OF THE INVENTION

It is known in the art to combine different forms of plastic with different forms of natural fiber such as wood flour, crushed shells of nuts, and other natural materials. The purpose of such previous combinations has been to enhance the physical properties and lower the cost of the product.

In the art of window and door components and trim, such components have historically been made of 100% natural wood. Residential windows are commonly manufactured from milled wood products that are assembled with glass to form double hung or casement units. Wood windows, while structurally sound, useful and well adapted for use in many residential installations, can deteriorate under certain circumstances. Wood windows also require painting and other periodic maintenance. Wood windows also suffer from cost problems related to the availability of suitable wood for construction. Clear wood products are slowly becoming more scarce and are becoming more expensive as demand increases. As an alternative to wood, metal components are often combined with glass and fabricated into windows. Metal windows however, typically suffer from substantial energy loss during winter months.

In recent years, extruded thermoplastic materials have been used in window and door manufacture. Filled and untilled thermoplastics have been extruded into components to form plastic windows and into seals, trim, weatherstripping, coatings, and other window construction components. Thermoplastic materials such as polyvinyl chloride (PVC) have been combined with wood members in manufacturing some windows for certain performance and cost advantages. The plastic is often colored with a coloring agent to give a wood-like appearance or to match the colors of the surrounding area. Although the colored plastic may appear somewhat wood-like, it cannot be painted or sanded or stained like real wood. For this reason, it was difficult, if not impossible, to match plastic components to natural wood surroundings. Another product is to wrap the plastic with a foil or laminate having a wood-like appearance. Still another product is to epoxy wood laminates onto the thermoplastic. Such laminates are expensive and easily damaged.

Polymer materials have been combined with cellulosic fiber to make extruded materials. However, such materials have not been successfully used in the form of a structural member that is a direct replacement for wood. Typical common extruded thermoplastic materials have been found not to provide thermal and structural properties similar to wood or other structural materials. Accordingly, a substantial need exists for a composite material that can be made of polymer and wood fiber with an optional, intentional recycle of a waste stream. A further need exists for a composite material that can be extruded into a shape that is a direct substitute for the equivalent milled shape in a wooden or metal structural member. This need requires a coefficient of thermal expansion that approximates wood, a material that can be extruded into reproducible stable dimensions, a high compressive strength, a low thermal transmission rate, an improved resistance to insect attack and rot while in use, and a hardness and rigidity that permits sawing, milling and fastening retention comparable to wood.

Further, companies manufacturing window and door products have become significantly sensitive to waste streams produced in the manufacture of such products. Substantial quantities of wood waste, including wood trim pieces, sawdust, wood milling by-products, recycled thermoplastic including recycled polyvinyl chloride, have caused significant expense to window manufacturers. Commonly, these materials are either burned for their heat value in electrical generation, or are shipped to qualified landfills for disposal. Such waste streams are contaminated with substantial proportions of hot melt and solvent-based adhesives, waste thermoplastic such as polyvinyl chloride, paint, preservatives, and other organic materials. A substantial need exists to find a productive, environmentally compatible process for using such waste streams for useful structural members and thus, to avoid returning the materials into the environment in an environmentally harmful way.

Therefore, the prior art teaches that conventional window and door manufacture has commonly used wood, metal and thermoplastic composites or a combination thereof. Wood windows, while structurally sound, can deteriorate under certain circumstances and require painting and other periodic maintenance. Thermoplastic, metal or thermoplastic composite windows have overcome this problem, but have created others. Metal windows typically suffer from substantial energy loss during winter months. Thermoplastic or thermoplastic composite windows, although structurally sound, have no wood on the inside which is generally preferred by the consumer. To overcome this shortcoming, manufacturers have used various alternatives. One such alternative is a combination of wood, metal or thermoplastic for the manufacture of windows which places the metal or thermoplastic on the outside of the window (thereby eliminating painting); while having the inside of the window as a wood surface, which can then be sanded, painted or stained. The thermoplastic or thermoplastic composite manufacturer often wraps the surfaces visible on the inside of the window with a foil or laminate having a wood-like appearance. Such foils however, are expensive, difficult and time consuming to apply and are easily damaged by the end-user. At best, they are only an imitation which is obvious to the end-user and cannot be sanded or stained. Another approach is to glue wood veneer on the inside of the window surfaces. This however, is difficult to apply and extremely costly.

The present invention relates to a new and improved article and method of making the article which is effective in use and overcomes the foregoing difficulties and disadvantages while providing better and more advantageous overall results.

SUMMARY OF THE INVENTION

In accordance with the present invention, there is provided a process for combining cellulosic fiber and thermoplastic polymer materials, for example, wood fiber and polyvinyl chloride, coupled with the addition of a controlled amount of a release agent within defined shear rates, to form a composite material which is useful in forming structural members of controllable porosity, thereby permitting the application of stains and/or paints in a manner similar to that of natural wood.

In addition, the invention pertains to the additional step of coextruding an additional thermoplastic material (e.g., PVC) to form a unique composite of a composite plus a thermoplastic (i.e., composite of thermoplastic and wood flour plus either the same or another thermoplastic). This composite can be used to produce window and door parts that can be sanded, painted and stained on the natural fiber/thermoplastic side and have the advantage of the thermoplastic on the other side. This composite material can be used to replace parts being produced from wood, thermoplastic or metal such as alumina and a combination thereof.

The process of this invention manufactures a composite shape comprising a mixture of polymer and cellulosic fiber with optionally, a polymer such as polyvinyl chloride. In making the natural fiber/PVC composite, about 10–55% of fiber and about 90–45% polymer are combined in an extruder. The materials are blended in a high intensity mixer and extruded in a multi screw extruder. This is the preferred method, but it is recognized that blending and mixing can be done in the multi screw extruder, thereby eliminating the high intensity mixer. The mixture is blended under melt conditions in the extruder under sufficient conditions of temperature and pressure to permit degassing (i.e., extracting water out of wood flour, and the volatiles and water out of the PVC) and simultaneously have an extradate with a porosity that when formed, can be sanded, painted and stained.

The preferred composite material can be made from many different plastics, e.g., polyolefin, polystyrene, poly(meth)acrylic or polyester. The most preferred system is polyvinyl chloride and wood flour. It has been found that the addition of a metal release agent is required to obtain a melt which is fracture-free. This agent counteracts the fusion enhancer and the two components must be combined in defined ratios to obtain good fusion and desired porosity. Shear rate through the die openings affect porosity. The higher the shear rate, the higher the porosity. Shear rates in the range of 200–500 $sec^{-1}$ have been found to produce the desired porosity. While a twin screw extruder is envisioned to be the best mode of practicing the invention, it is believed that a single screw extruder will also produce an acceptable product with certain screw and barrel modifications.

It is an object of this invention to provide a process by which wood flour, thermoplastic polymer and metal release agent are combined to result in a composite which is of controlled porosity.

It is another object of this invention to provide an improved extruder screw design by which the above composite can be formed.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Referring now to the drawings wherein the showings are for purposes of illustrating the preferred embodiment of the invention only and not for purposes of limiting the same, the Figures show a process and a product which results from the process taught in this invention.

Figure 10:
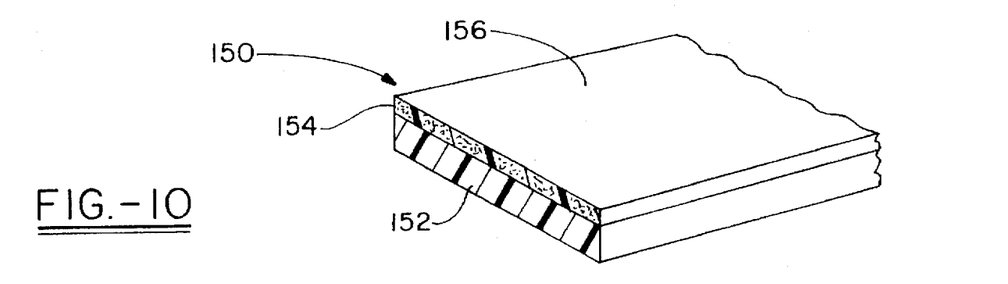
FIG. 10 is a perspective view of a piece of trim manufactured in accordance with the process described in this invention.

As shown in FIG. 10, a composite article (150) is shown having a first zone (152) and a second zone (154). In a preferred embodiment, the first zone is made entirely of plastic, most preferredly polyvinyl chloride. The second zone is a composite made of natural fiber and plastic. Once again, the most preferred plastic is polyvinyl chloride while the preferred natural fiber is wood flour. Other non-limiting examples of other thermoplastics believed to be useful in this invention would include polyolefins, polystyrene, polyacrylic and polyesters, while other natural fibers such as crushed nut shells are also envisioned as being capable of successful incorporation into this invention.

The surface (156) of the second zone (154) is formed so that it has sufficient porosity to hold and retain conventional wood stain. The porosity of surface (156) is controlled by a mechanism which is not as yet fully understood, but is believed to involve at least two variables. The addition of small amounts of porosity agents, sometimes referred to as metal release agents, affects surface porosity. Increasing the amount of porosity agent in the composite decreases the porosity of the surface while decreasing the amount of porosity agent increases porosity. The preferred porosity agent is available under the commercial name Rheochem Rheolube, a paraffin and/or hydrocarbon wax blend [GAS Reg. No. 8002-74-2] having a melting point above 170° F., (preferably above 185° F.) although other porosity agents, either alone or in combination with other porosity agents or metal release agents, which function in a similar capacity are also envisioned to be within the scope of this invention. Porosity agents are added in an amount of from 0.01% to 5%, more preferably from 0.1% to 4%, and most preferably from 0.5% to 3% weight percent. Shear rate through the extrusion die opening also determines the final composite porosity and measurable porosity was only achieved by using a shear rate which was between 220–500 sec$^{-1}$. Surface (156) is also sandable with conventional sandpaper and can also be paintable. As such, the surface can be sanded, painted or stained to closely resemble genuine wood and can be matched to other interior surfaces.

Wood flour (as wood) is comprised of different wood particles which tend to vary in color. A coloring agent (e.g., $TiO_2$) is added to eliminate this variation. This is accomplished in the second zone (154), where variations and color of natural fiber may make such color emulation difficult to control within precise color schemes. Typically another coloring agent (e.g., Ferro V9156) is added to simulate wood colors.

The composite which makes up the second zone includes 10% to 55% natural fiber and 45% to 90% PVC, and a sufficient amount of porosity agent as defined previously to obtain a surface suitable for staining. Additionally, a small amount of a fusion enhancer, e.g., AC-316 by Allied Signal, an oxidized polyethylene of general formula $CH_3(CH_2)_m(CH_2COOH)_n$ of molecular weight greater than 900, [CAS 68441-17-8] is required to promote fusion in the extruder prior to venting to allow application of a vacuum to abstract moisture from the natural fiber. This fusion enhancer, an oxidized polyolefin is typically added in an amount of from 0.01% to 2%, more preferably from 0.05% to 1%, and most preferably from 0.01% to 0.5% by weight. It is recognized that any oxidized polyolefin of molecular weight of 1,000 or less will be effective in this application in addition to other fusion enhancers of this general type in general having a softening point between 87°–140° C.

Figures 1, 2:
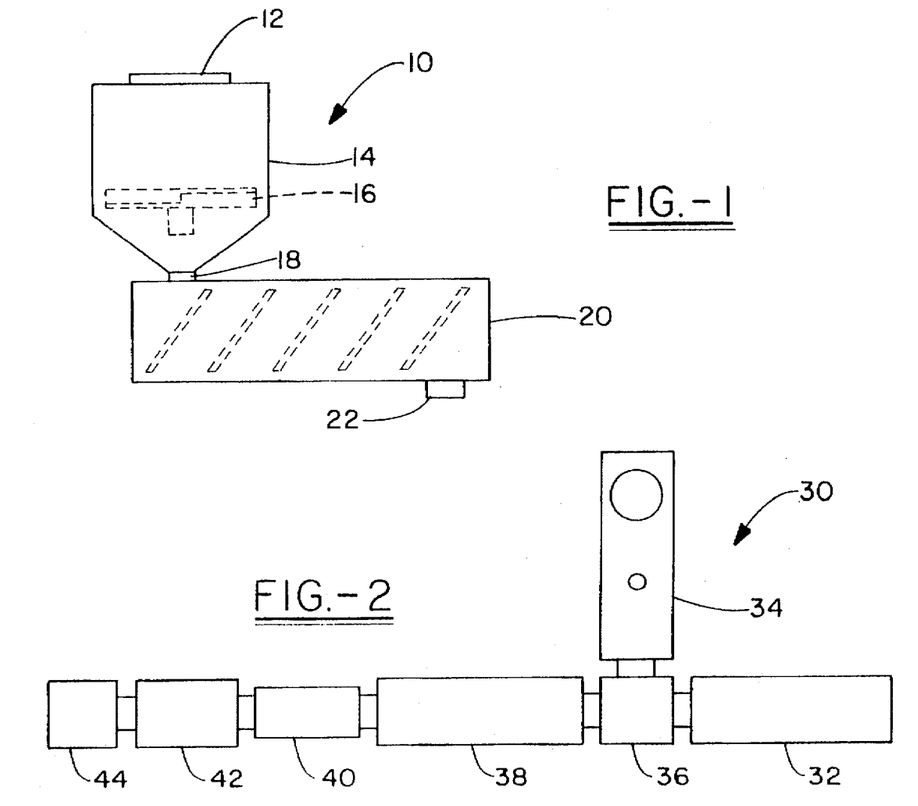
FIG. 1 is typical manufacturing setup for equipment used to compound a PVC/wood composite.
FIG. 2 is a manufacturing setup showing two extruders and a dual extrusion head, with subsequent material processing equipment.

As shown in FIG. 1, a typical manufacturing mixing setup is shown in order to produce the plastic/wood composite. In an illustrative example, the following materials as shown in Table I would be added into mixing apparatus (10) through inlet (12).

TABLE I

| Component | Quantity (lbs.) |
| --- | --- |
| Wood Flour (American Wood Flour) | 50.0 |
| Porosity gent - Hydrocarbon wax (Rheochem Rheolube 185) | 2.5 |
| Fusion Enhancer (Allied Signal AC316A) | 0.3 |
| Pigment (Dupont R960 $TiO_2$) | 5.0 |
| Pigment (Ferro V9156) | 1.5 |
| PVC (Georgia Gulf 3304/WH194) | 116.0 |

The preferred plastic is polyvinyl chloride or PVC, although it is envisioned that other thermoplastic would also be operative in this process making appropriate temperature modifications due to polymeric base property differences.

Other envisioned thermoplastics would include polyolefins, polystyrene, polyacrylic and polyesters. The preferred natural fiber, wood flour, is manufactured in hardwood and pine grades, or in any natural fiber containing cellulose, and in various particle size distributions. Wile the mesh sizes from 20 mesh (850µ) to 140 mesh (106µ), the preferred wood fiber is 80 mesh (180µ) hardwood grade.

The high intensity mixer (10) is started using mixing blade (16) in hopper (14) after the ingredients are added via inlet (12). Mixing continues until the temperature of the mixture reaches 210° F. This temperature is higher than the melting point of the porosity aid used (Rheolube), but lower than its decomposition temperature. As the porosity aid is melted, it adheres to the wood and other ingredients making a better homogeneous mixture. Upon reaching the final mixing temperature, the high intensity mixer (10) is stopped and its contents discharged via outlet (18) into water jacketed ribbon blender (20) which reduces the mixture temperature to a lower constant temperature, thereby reducing the heat history of the composite material. In a preferred embodiment, this reduced temperature is room temperature. Variations in material temperature will cause extrusion throughput changes, which is highly undesirable, as would be the case when the material is used immediately after blending. Since generally some period of time passes prior to the utilization of the material, the temperature is reduced to room temperature for convenience, and to minimize degradation.

In FIG. 2, a typical manufacturing operation (30) is shown schematically. A first extruder (32), into which the mixed polymer/fiber has been added of FIG. 1, extrudes the natural fiber/plastic compound through a dual extrusion head (36). A second extruder (34) which is necessary to make a co-laminated extruded product, but optional to simply make a natural fiber/plastic compound, extrudes a solid polymer (e.g., PVC), also through the dual extrusion head. The preferred manufacturing operation utilizes a conical twin extruder because it has good PVC processing characteristics, can homogenize the PVC/wood flour mixture and all other ingredients. In addition, it has venting capability to extract water from the wood flour and the other components. Wood flour can have between 1–10% water initially present, (more typically 3–6%), and this amount is reduced down to less than about ½%. After the composite has been extruded through the dual extrusion head (36), it passes to a vacuum calibration device (38), described more fully with reference to FIGS. 7–8, an embossing station (40), described more fully with reference to FIG. 9, a puller (42) which continues to pull the extruded composite through the process apparatii and a cutter (44) which cuts the composite to desired lengths. While separate mixing and extruding equipment has been described, for some applications, it is possible that the step of mixing can occur in the extruder. It is of course appreciated that the designation of first and second extruders is for purposes of convenience only, and that material fed into one extruder could just as easily be fed into the other extruder after having incorporated the modifications to the screw design as discussed below in addition to the appropriate temperatures as also discussed.

Figure 3:
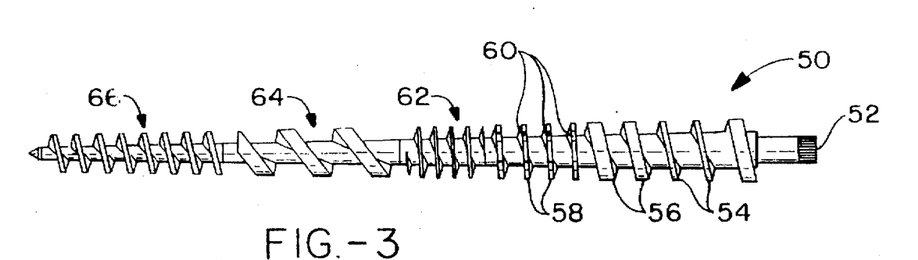
FIG. 3 is a side view of an extruder screw as would be used in FIG. 2 for performing the process of the present invention.
Figure 3A:
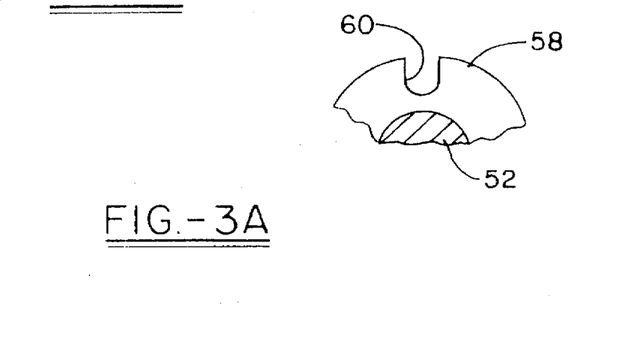
FIG. 3a is an expanded view of a notch configuration in the pre-compression section of the extruder screw as shown in FIG. 3.

As shown in FIG. 3, one customized screw (50) from the extruder (32) is shown. Because of the high wood flour content in the compound, a set of high shear screws are utilized to enhance fusion before the vent. To further enhance the fusion process, the feed and shear sections prior to the vent have been modified to increase the feed (wood flour greatly decreases the bulk density) and increase the shear action of the screws. A screw shaft (52) is divided into a plurality of sections, each designed to maximize the performance of one aspect of this process. In the feed section, screws (56) of width (w), e.g., 0.560" are reduced to screws (54) having a more narrow width (w'), e.g., 0.236" to permit more feed into the extruder and minimize the wear and tear on the screw flights. In the pre-compression section, a plurality of notches (60), (26 notches as used in a specific embodiment of this invention) are cut into the screws (58) to increase the amount of shear to which the composite is exposed, since a homogeneous melt has yet to be made, leading to compression section (62) where the fusion is maximized. The pre-compression screws notches are ~1" diameter and the notches are ~0.17" up from the root diameter of the screw with ~6 notches per flight as shown in FIG. 3a. Vent flight (64) relieves the pressure generated by the fusion process and water vapor release leading to metering section (66) which leads to extrusion die (36). Insufficient vacuum leads to a product which easily goes through the die, but which has no mechanical strength. The vacuum used typically is about 0.6 bar, but can range from 0.2 to 1 bar.

As indicated previously, wood flour reduces the bulk density of the composite formulation. With the preferred 30-40% wood flour content, extrusion in a multi-screw extruder, with conventional screws, such as used in PVC pipe extrusion, was simply not possible. The material was not sufficiently melted to allow abstracting water and volatiles. Altering the screws as described previously, to obtain more volume in the metering zone and more shear in the compression section, permitted controlled venting. It has also be determined that the temperature profile of the extruder is important in developing the characteristics associated with the composite of this invention. It has been found that a high initial temperature in the input zone of the extruder is important, while reducing the temperature through the extruder zones as the material passes from the input zone through interior zones to the die zones aids in melting the material prior to the venting port, and also aids in forming a melt that is homogeneous and has porosity after it exits the die.

In a preferred embodiment of this invention, the temperature profile of the extruder comprises a high input temperature, a step-wise reduction in temperature as the material passes from the input zone through the interior zones of the extruder. The temperature of the coextrusion die is greater than the interior zone, but less than the input (feed) zone. Even using the above mentioned steps, melting prior to the vent was difficult. The addition of a fusion enhancer greatly enhances fusion prior to the vent, but also has an adverse effect on the porosity of the melt.

The preferred extruder for performing the present invention is a Krauss-Maffei KMD 60 multi-screw extruder. Other extruders such as Cincinnati Milacron (CM-55) could also be utilized in the invention. The KMD 60 is preferred in that it has a positive displacement pump for the controlled transport of material through a die. The extruders used in this invention will have as major components, a barrel and preferably two screws, to transport, mix and compress the material, a heating and cooling system to control the heat needed for processing, a drive train to power the screws, and a control station for controlling the operation of the extruder, including instruments to monitor the process and indicate possible problems.

Figure 4:
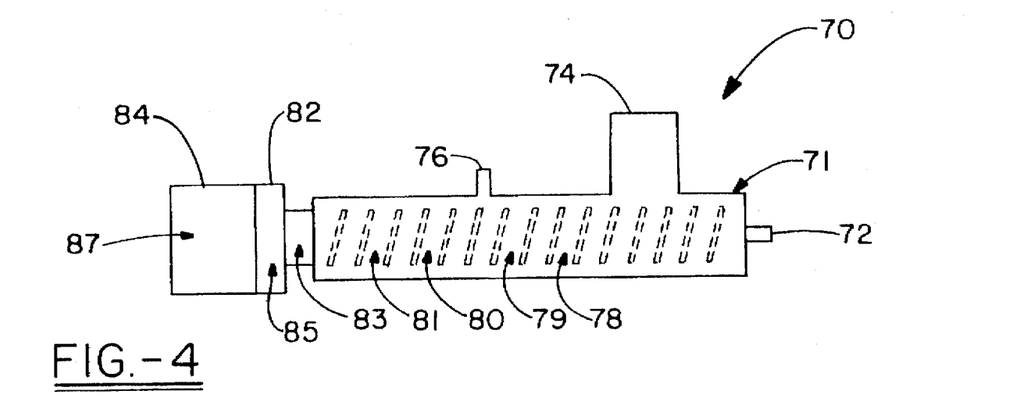
FIG. 4 is a side view of an extruder with various identified temperature zones.

The barrel will be of a meshing, dual conical tape bore. The combination of barrel taper and screw flight provides proper compression of the composite material. As shown in FIG. 4, the barrel is manufactured in one piece and has four operational zones. The larger outside diameter of the screws in the barrel intake area, zone 1 (78), allows for good intake of material and provides a large surface area for heat transfer to the material. Between zones two (79) and three (80), is a vent (76) to allow moisture and other gases to escape from the barrel (71). The fourth zone (81) is a metering zone where the material is compressed and metered out to a die (84). Between die (84) and extruder barrel (71) is an adapter (82) having zones 5 (83) and 6 (85).

The screws each have a hollow core through which heat transfer liquid is circulated. This allows the transfer of unwanted frictional heat from zone 4 (81) back toward zone 1 (78). The four heat zones on barrel (71) are independently controlled by electric heat bands and heat exchangers for accurate stabilization of operation temperatures. Likewise, zones 5 (83) and 6 (85) on adapter (82) and zone 7 (87) on die (84) are independently controlled by heater bands and heat exchangers for accurate temperature control. The temperature of the heat transfer liquid in the screws is also independently controlled. The preferred screws are Krauss-Maffei Pipe screws (high shear and high compression), and the preferred die is a custom-built co-extrusion die.

Heat is applied to the four barrel zones by the electric heat bands. Heat is removed from barrel (71) by circulating oil through coils wound around the barrels at zones 2 (79), 3 (80) and 4 (81). The oil is circulated by a pump unit through a heat exchanger located in the base of the extruder. The barrel cooling system is equipped with flow indicators for a visual check of the cooling performance in each cooling zone. Screw core cooling/heating is accomplished with an independent temperature control unit.

The drive train begins with an infinitely variable speed, constant torque drive motor coupled to a speed reducer. From the speed reducer, the drive train evolves into a two-shaft distribution gear drive. Since the drive shafts are on the center lines of their corresponding tapered screws, it is possible to use large gears for torque transfer and large bearings to take up the axial force (back pressure) generated in the operation of the extruder. In order to achieve consistent quality of product, the speed and motor load of the drive train and the axial load of the thrust bearings are measured. The temperature within extruder (70) is elevated to have a profile as shown in Table II.

TABLE II

| Twin Screw Extruder Temperature Profile | | |
|---|---|---|
| Zone | Temp (°F.) Extruder #1 | Temp (°F.) Extruder #2 |
| Screw oil | 395 | 240 |
| 2 Zones before vent | 395 | 360 |
| 2 Zones after vent | 335 | 290 |
| Adapter | 375 | 375 |
| Extrusion die | 390 | 390 |

The temperature profiles of screw oil temperature (72), temperature two zones before (78) the vent (76), two zones after (80) the vent, the adapter (82) and extrusion die (84) are shown.

Figure 5:
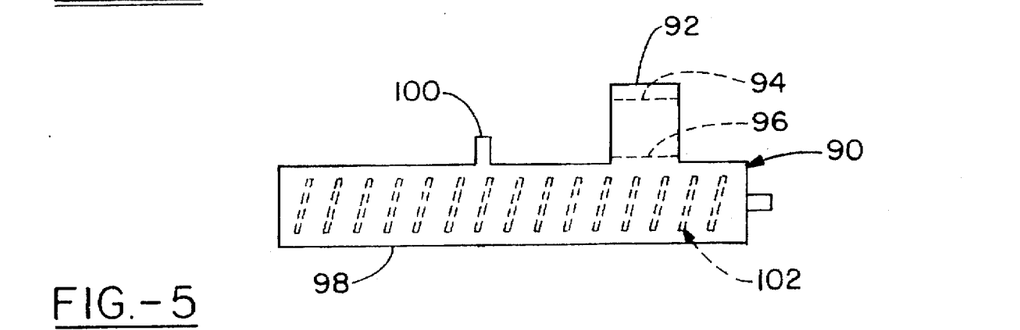
FIG. 5 is a side view of an extruder showing the proper feeding level within the feed tube.

As shown in FIG. 5, in most extruder applications, the common practice is to flood feed (94) the extruder (90). This should be avoided. The high wood flour content with 5-6% moisture, gives off steam when it comes into contact with the extrusion screws (102). It is difficult for the steam to escape when the feed throat (92) is flood fed (94) leading to clumping of material and output variations. A level that barely covers the screws (96) is ideal.

Figure 6:
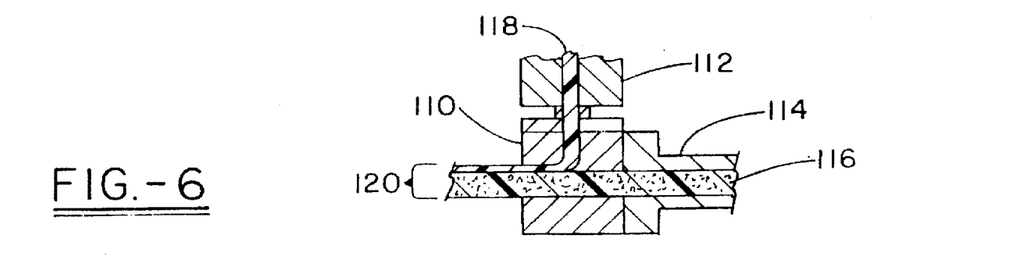
FIG. 6 is a side view shown in cross-section of the co-extrusion die.

When the extrudate exits the adapter (82) of FIG. 4, it enters into the integrally attached co-extrusion head (110) as shown in FIG. 6 wherein PVC extradate (118) from the second extruder (112) is coextruded onto natural fiber/PVC extradate (116) from the first extruder (114) to form the coextruded composite (120). A typical temperature profile of the second extruder (112) would be essentially as follows (Table III) when it is a single screw extruder, and would appear as the second column in Table II when a double screw extruder. Broader ranges for the temperatures would encompass from 330°–425° F. before the vent, from 280°–390° F. after the vent, from 300°–425° F. adjacent to the die, from 350°–425° F. at the die, and a screw oil temperature from 330°–425° F.

TABLE III

| Zone | Temperature (°F.) |
| --- | --- |
| Rear | 340 |
| Adjacent 2 Zones | 330 |
| Adapter | 310 |

Figure 7:
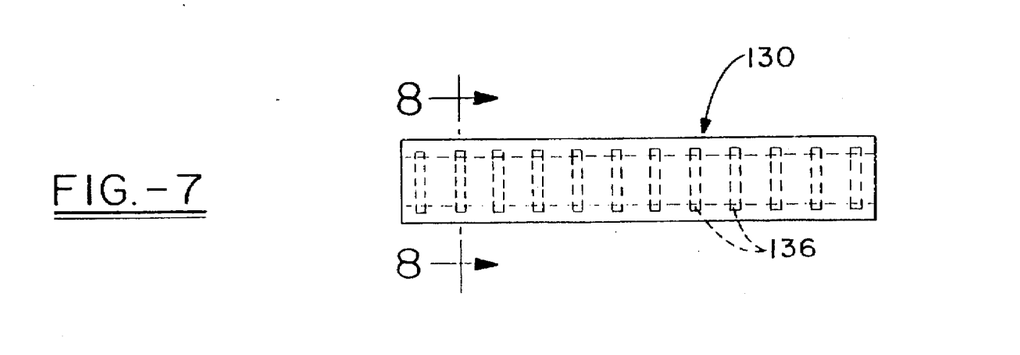
FIG. 7 is a side view a vacuum calibration device.
Figure 8:
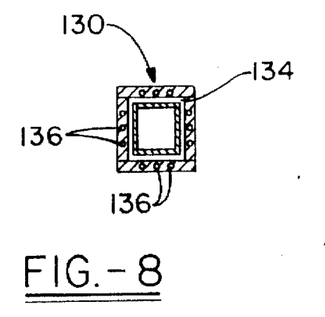
FIG. 8 is a cross-sectional view of the vacuum calibration device shown in FIG. 7 along line 8—8.

As shown in FIGS. 7 and 8, the composite extradate (120) then passes through a vacuum calibration device (130) having vacuum grooves (134). The internal configuration which touches the composite extradate has the shape of the final shape of the desired profile. A vacuum is applied to the composite shape to make it conform to the calibration configuration and continuously mold and cool the product. The calibration device is water cooled using water cooling channels (136) so that the composite extradate cools while being formed.

Figure 9:
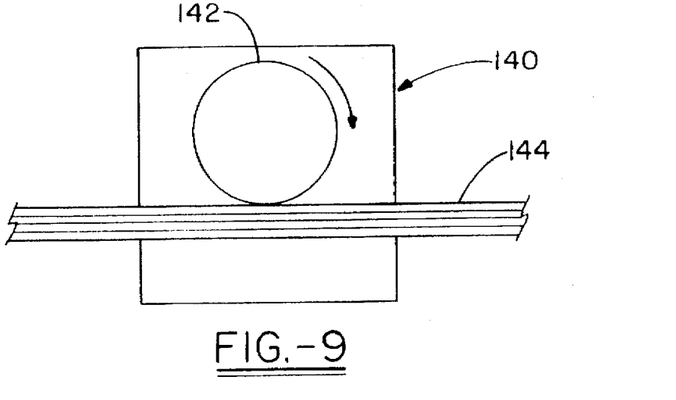
FIG. 9 is a side view of an embossing station.

The composite shape is now completely cooled and enters the embossing station (140) as shown in FIG. 9. This is a 6" diameter hardened and chrome plated wheel (142) which is embossed with typically either a pine or oak pattern (144). It is heated to 350°–390° F. and sufficient pressure is applied to obtain a wood pattern while it is being rotated from the composite shape being pulled through, although in some applications, the embossing station may be motor-driven. Depending on the number of surfaces which are to be embossed, an embossing roll is required for each surface.

While the embosser is shown subsequent to the calibration device, it is also envisioned that in some applications, the embossing station (140) may be positioned subsequent to the extrusion die, followed by sizing calibration operations. In this instance, the material will still be hot and will require that the embossing station be motor driven and cooled.

The finished composite shape then passes through a puller which acts as the pulling force to pull the composite through the calibration device and embossing stations. The composite shape is then pushed through a saw which travels with the shape as it is being sawn to length.

Figure 11:
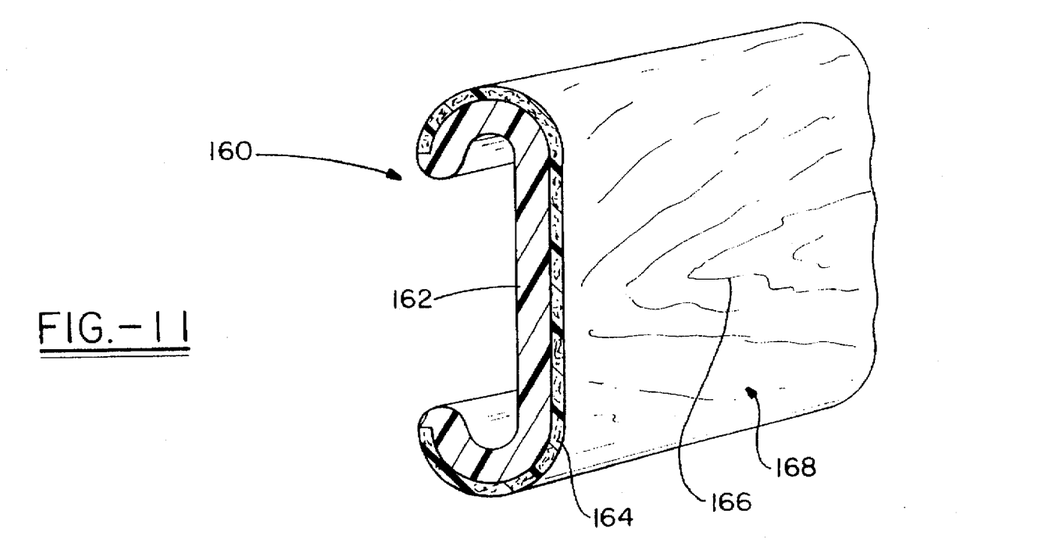
FIG. 11 is a perspective view of a handle rail manufactured in accordance with the process described in this invention.

When the above process is followed, various products such as trim (FIG. 10), handle rails (FIG. 11), double hung windows (FIG. 12), doors (FIG. 13), and window components (FIG. 14) can be produced. As discussed previously with reference to FIG. 10, the handle rail shown in FIG. 11 shows the coextruded composite (160) wherein the outer surface (168) represents the composite natural fiber/PVC component (164) and the inner surface is the PVC segment (162). The outer surface (168) may be embossed with a wood grain pattern (166) which can then be stained or painted.

Figure 12:
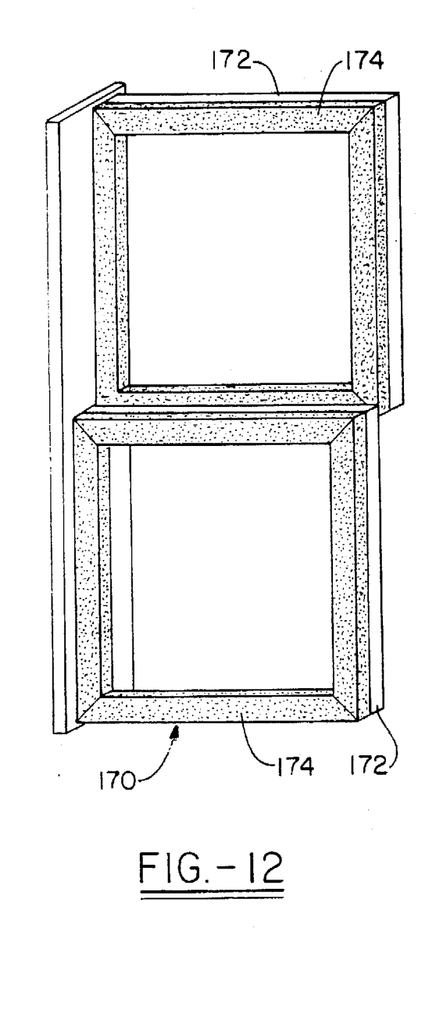
FIG. 12 is a perspective of a double hung window utilizing components manufactured in accordance with the process described in this invention.

The double hung windows shown in FIG. 12, also shows the coextruded construction (170) wherein the inner composite (174) is the natural fiber/plastic component and the outer section (172) is the PVC segment. In this arrangement, the inner composite (174) can be stained and/or painted to match interior room decor. Due to temperature variations in windows, with very cold weather on one side of the window and warm temperatures on the interior side, dimensional integrity of plastic window components can be a problem. Since natural fibers have better thermal stability when compared with many plastics, the addition of natural fiber can improve performance. Prior art vinyl windows would necessarily have plastic components visible from the interior side of the window. These interior components could only roughly approximate the appearance of natural wood. Some previous attempts to rectify this included wrapping such components with foil which simulated wood grain. However, this represented an expensive solution and the foil was often too fragile to retain its appearance for long period of time under heavy use.

Figures 13, 14:
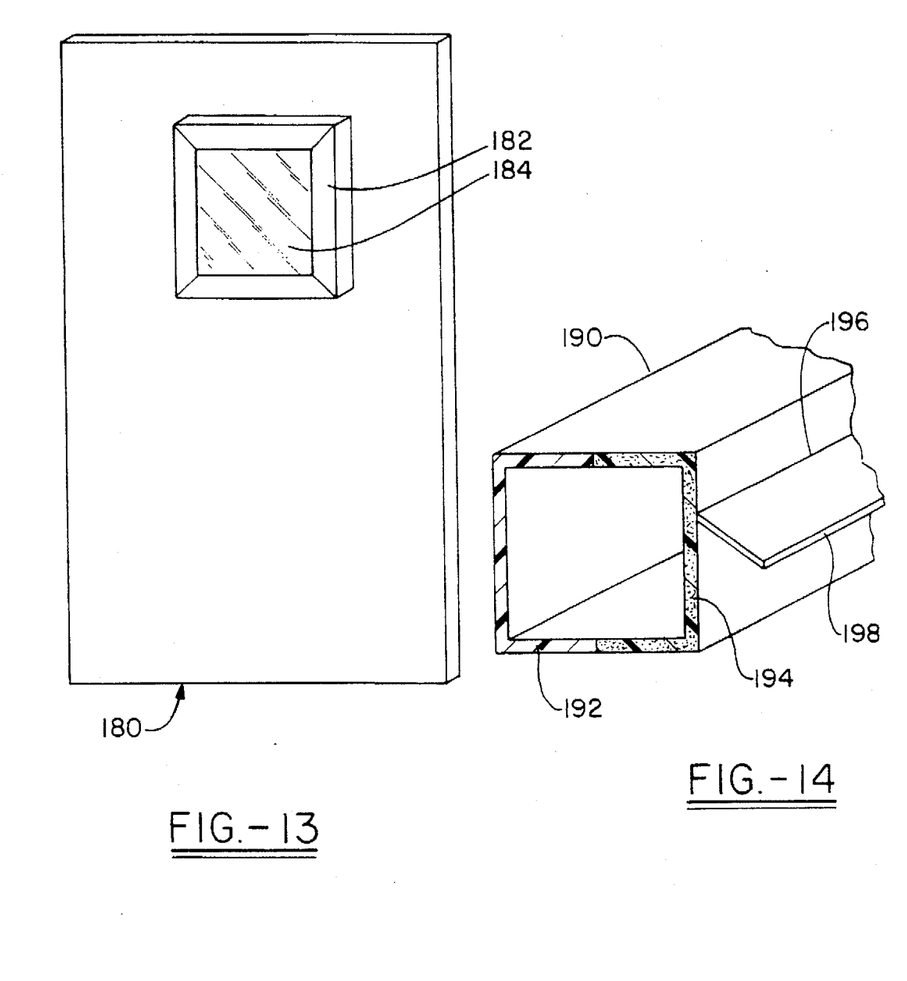
FIG. 13 is a steel, fiberglass or wood door utilizing components manufactured in accordance with the process described in this invention.
FIG. 14 is a window component manufactured in accordance with the process described in this invention.

With reference to FIG. 13, another common application of the invention is shown. A door (180) is primarily made of wood, metal, or fiberglass. Some designs feature window glass (184) surrounded by trim (182). This trim is a good application of the composite article shown in FIG. 10.

In one specialized utilization of this invention shown in FIG. 14, a piece of weather stripping (198) is affixed along a longitudinal edge (196) to form an insulation sealed coextruded product (190) having a natural fiber/PVC component (194) and a PVC component (192). It is recognized that when the product manufactured is as shown in FIG. 13, an additional extruder is necessary, and the co-extrusion head discussed previously, will be modified to allow an additional melt stream which will form the weatherseal (i.e., a tri-extrusion head). When using flexible vinyl as the additional melt stream, an effective bond is found to be made between the composite material and the weatherseal. While flexible vinyl is typically preferred for many window and door applications, there is no need to limit the invention to such and other materials that bond to rigid PVC and/or natural fiber/PVC composites would also work. While the processing conditions are generally known throughout the industry for extrusions involving flexible vinyl, a typical set of temperatures in the extruder/head would be approximately 270° F. for the rear zone and zone 2 as defined previously, and 320° F. for zone 3 and the adapter.

The amount of stain/porosity absorption the final extruded profile will have is dependent on the porosity of the external surface. The greater the porosity, the greater the absorption. Porosity is controlled by adding a small amount of additional porosity agent to the mixture (commercially available PVC having some metal release agent or porosity agent already added). The preferred porosity agent is Rheochem Rheolube 185. It has been found that this release agent also deters fusion in the feed, pre-compression and compression portion of the extruder. In the extruder, venting (extracting moisture via vacuum from the wood) becomes very difficult since the wood/PVC have not been sufficiently melted to form a homogeneous melt in the vent section of the extruder. In this case, water, PVC and some wood flour can be extracted into the vent section. To overcome this problem, the high compression/high shear standard pipe screws were modified by narrowing the two flight widths in the feed section to allow more feed. Also, notches were added in the pre-compression section of the screws to obtain more shear. Insufficient fusion was still at the vent and a fusion enhancer needed to be added to the mixture to obtain melt which is suitable for venting. Another factor that influences porosity is shear rate through the die opening (straight land length), shear rates (based on PVC only) between 220–500 sec$^{-1}$ showed good porosity with the preferred mixture.

Figure 15:
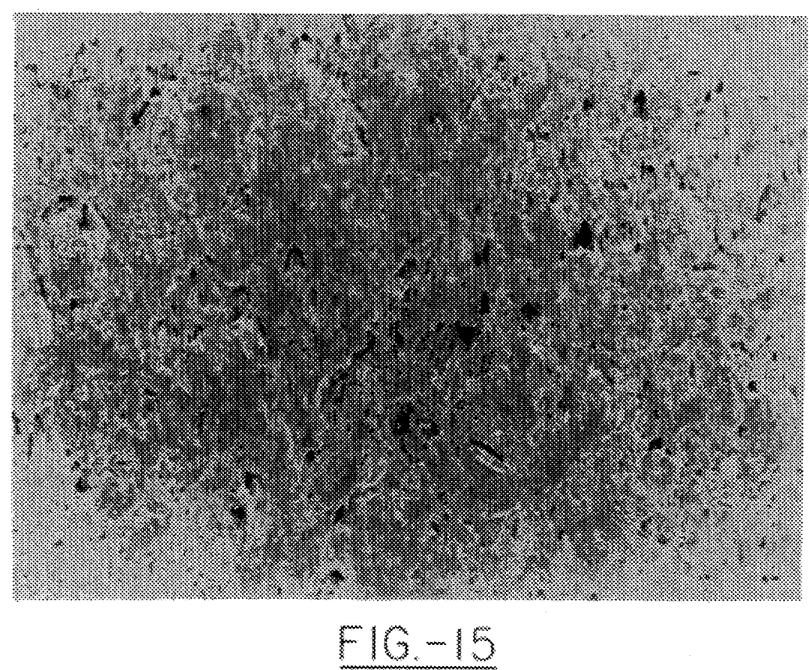
FIG. 15 is a scanning electron micrograph of a natural fiber/PVC composite taken at 15 KV at 20× magnification.
Figure 16:
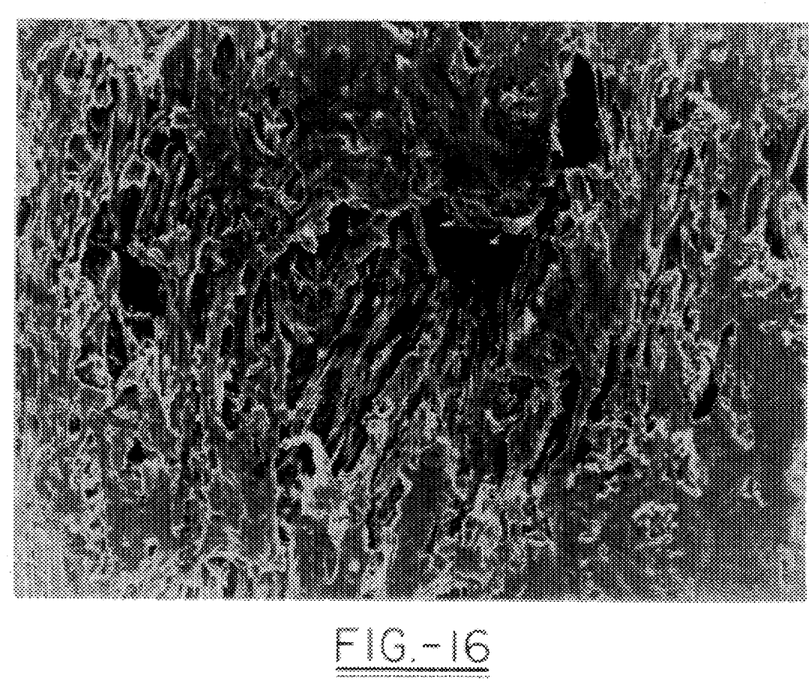
FIG. 16 is an enlarged scanning electron micrograph of FIG. 15 taken at 15 KV at 100× magnification.

The significance of the porosity is clearly shown in FIGS. 15–16, which are photographs of the natural fiber/PVC component only. FIG. 15 is an enlargement at 20× magnification taken at 15 KV with a 1 mm reference mark embedded in the picture. The porosity which is due to void formation, is clearly evident. At the higher magnification 100×, shown in FIG. 16, these voids are even more prevalent, as shown with the 100μ mark embedded therein. The samples were prepared by the teachings described above. In order to calculate porosity, the surface picture is digitized and with the aid of a software package, the mount of voids over a given area is calculated, based on black vs. white pixels. The porosity of the composite in these Figures is approximately 22%. Both samples show micro voids uniformly dispersed on the surface.

A comparative study was made regarding the impact of various variables which are present in the system. The variables studied were the effect of material pre-blending of all components with the exception of the wood flour, barrel zone temperatures 3&4, screw oil temperature, feed level, vent vacuum and die temperature. The following matrix (Table IV) was used to evaluate the effect of the six factors on the melt strength of natural fiber/PVC composite extradates. Low melt strength has historically been one of the major problems experienced with this type of product.

TABLE IV

| Factor | Variable Range #1 | Variable Range #2 |
|---|---|---|
| Starting Material | no pre-blending | pre-blending |
| Barrel 3 & 4 temp (°F.) | 295 | 335 |
| Screw Oil temp (°F.) | 365 | 395 |
| Feed level | flood | starve |
| Vent vacuum | 0.3 | 0.8 |
| Die temp (°F.) | 365 | 395 |

A partial factorial designed experiment was conducted with the above variables. Melt strength was measured by gradually increasing the puller speed until the line broke. A sample immediately prior to the break was retrieved, measured and weighed. From this data, it was possible to calculate the weight/inch of the part. The lower the number, the higher the melt strength.

The product made from the non-preblended material showed an 11.6% increase in melt strength. The higher barrel temperature also produced a product with 13.4% more melt strength, while increasing the vent vacuum resulted in 5.7% more melt strength. Screw oil temperature, feeder level and die temperature were shown to be essentially non-critical factors in determining melt strength.

Porosity determines the stainability of the final extrusion. The higher the porosity, the more stain it will absorb. Conversely, the lower the porosity, the less stain will be absorbed. A 22% porosity (void percentage) is preferred. Porosity in the range of 5% to 40% will stain, and the mount is a visual preference by the end-user.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for the preparation of a porous natural cellulosic wood fiber and thermoplastic composite wherein the thermoplastic is selected from the group consisting of polyvinyl chloride, polyolefins, polystyrenes, polyacrylics and polyesters comprising:

mixing the natural cellulosic wood fiber and the thermoplastic with a porosity aid which is selected from the group consisting of a paraffin and a hydrocarbon wax blend having a melting point of 200° F. or lower, and an oxidized polyolefin fusion enhancer which forms a homogeneous melt of the natural cellulosic fiber and the thermoplastic and modifies the effect of the porosity aid which deters fusion, yet retains porosity in the composite and forms a mixture;

extruding the mixture through an extrusion die of an extruder as the composite; and shaping the composite to a desired profile.

2. The process of claim 1 wherein the step of mixing occurs in a high intensity mixer at a temperature of about 180°–240° F.

3. The process of claim 2 wherein the temperature is about 210° F.

4. The process of claim 1 wherein after the step of mixing, the mixture is cooled.

5. The process of claim 4 wherein the mixture is cooled to about room temperature.

6. The process of claim 1 wherein at least two flights within the pre-compression flights have at least two notches cut into a peripheral area of the flights.

7. The process of claim 1 wherein the extruder is a twin-screw extruder.

8. The process of claim 7 wherein a mixture level within a feed opening to the extruder is at a level which covers the screws.

9. The process of claim 1 which further includes the step of embossing the composite.

10. The process of claim 1 wherein the thermoplastic is polyvinyl chloride.

11. The process of claim 1 wherein the oxidized polyolefin is an oxidized polyethylene having a molecular weight of 900 or less.

12. The process of claim 1 wherein the extrusion die is a dual extrusion die and a second thermoplastic is coextruded onto the composite.

13. The process of claim 12 wherein the second thermoplastic is selected from the group consisting of polyvinyl chloride, polyolefins, polystyrenes, polyacrylics and polyesters.

14. The process of claim 13 wherein the thermoplastic is polyvinyl chloride.

15. The process of claim 1 wherein a shear rate is from 220–500 sec$^{-1}$.

16. The process of claim 1 which further comprises
compressing the mixture in the extruder with at least one extruder screw having a plurality of flight sections, at least one of the flight sections serving as a compression flight section which compresses the mixture by having flights in the compression flight section spaced closer together than other adjacent flight sections, and at least one other vent flight section which allows gaseous reaction products to be removed from the extruder through a vent in the extruder by having flights in the vent flight section spaced farther apart than the compression section, the vent flight section being positioned after the compression flight section.

17. The process of claim 16 wherein at least two flights of a feed flight at an inlet of the extruder are thinner than feed flights adjacent to a pre-compression flight positioned downstream of the inlet.

18. The process of claim 16 wherein a temperature profile of the extruder is from 330°–425° F. before the vent, from 280°–390° F. after the vent, from 300°–425° F. adjacent to the die, from 350°–425° F. at the die, and a screw oil is from 330°–425° F.

19. A coextrusion process for the preparation of a composite having a first component comprising a first thermoplastic and a second component comprising a second thermoplastic and a natural cellulosic wood fiber, wherein the first and second thermoplastics are selected from the group consisting of polyvinyl chloride, polyolefins, polystyrenes, polyacrylics and polyesters which comprises the steps of:

mixing the natural cellulosic wood fiber and the second thermoplastic with a porosity aid which is selected from the group consisting of a paraffin and a hydrocarbon wax blend having a melting point of 200° F. or lower, and     an oxidized polyolefin fusion enhancer which forms a homogeneous melt of the natural cellulosic fiber and the second thermoplastic and modifies the effect of the porosity aid which deters fusion, yet retains porosity in the composite and forms a mixture of the second component;

extruding the mixture of the second component and the first thermoplastic of the first component through a dual extrusion die of an extruder to form the composite; and     shaping the composite to a desired profile.

20. The process of claim 19 wherein the step of mixing occurs in a high intensity mixer at a temperature of about 180°–240° F.

21. The process of claim 20 wherein the temperature is about 210° F.

22. The process of claim 19 wherein after the step of mixing, the mixture is cooled.

23. The process of claim 22 wherein the mixture is cooled to about room temperature.

24. The process of claim 20 wherein at least two flights within the pre-compression flights have at least two notches cut into a peripheral area of the flights.

25. The process of claim 19 wherein the extruder is a twin-screw extruder.

26. The process of claim 25 wherein a mixture level within a feed opening to the extruder is at a level which covers the screws.

27. The process of claim 19 which further includes the step of embossing the composite.

28. The process of claim 19 wherein the first thermoplastic is polyvinyl chloride.

29. The process of claim 21 wherein the oxidized polyolefin is an oxidized polyethylene having a molecular weight of 900 or less.

30. The process of claim 19 wherein the second thermoplastic is polyvinyl chloride.

31. The process of claim 19 wherein a shear rate is from 200–500 sec$^{-1}$.

32. The process of claim 19 which further comprises compressing the mixture in the extruder with at least one extruder screw having a plurality of flight sections, at least one of the flight sections serving as a compression flight section which compresses the mixture by having flights in the compression flight section spaced closer together than other adjacent flight sections, and at least one other vent flight section which allows gaseous reaction products to be removed from the extruder through a vent in the extruder by having flights in the vent flight section spaced farther apart than the compression section, the vent flight section being positioned after the compression flight section.

33. The process of claim 32 wherein at least two flights of a feed flight at an inlet of the extruder which forms the second component are thinner than feed flights adjacent to a pre-compression flight positioned downstream of the inlet.

34. The process of claim 32 wherein a temperature profile of the extruder which forms the second component is from 330°–425° F. before the vent, from 280°–390° F. after the vent, from 300°–425° F. adjacent to the die, from 350°–425° F. at the die, and a screw oil is from 330°–425° F.

35. A process for the preparation of a porous natural cellulosic wood fiber and polyvinyl chloride composite comprising:

mixing the natural cellulosic wood fiber and the polyvinyl chloride with         a porosity aid which is selected from the group consisting of a paraffin and a hydrocarbon wax blend having a melting point of 200° F. or lower, said porosity aid added in an amount of from about 0.01% to 5% by weight; and         an oxidized polyethylene fusion enhaneer which forms a homogeneous melt of the natural cellulosic wood fiber and the polyvinyl chloride and modifies the effect of the porosity aid which deters fusion, yet retains porosity in the composite and forms a mixture, said fusion enhancer added in an mount of from about 0.01% to 2% by weight;

extruding the mixture through an extrusion die of an extruder as the composite; and     shaping the composite to a desired profile.

36. A coextrusion process for the preparation of a composite having a first component comprising polyvinyl chloride and a second component comprising polyvinyl chloride and a natural cellulosic wood fiber, which comprises the steps of:

mixing the natural cellulosic wood fiber and the polyvinyl chloride of the second component with         a porosity aid which is selected from the group consisting of a paraffin and a hydrocarbon wax blend having a melting point of 200° F. or lower, said porosity aid added in an amount of from about 0.01% to 5% by weight; and         an oxidized polyethylene fusion enhancer which forms a homogeneous melt of the natural cellulosic fiber and the polyvinyl chloride and modifies the effect of the porosity aid which deters fusion, yet retains porosity in the composite and forms a mixture of the second component, said fusion enhancer added in an mount of from about 0.01% to 2% by weight;

extruding the mixture of the second component and the first component through a dual extrusion die of an extruder to form the composite; and     shaping the composite to a desired profile.

\* \* \* \* \*